United States Patent
Best et al.

[15] 3,675,802
[45] July 11, 1972

[54] BALE WAGON

[72] Inventors: Albert M. Best, New Holland; Keith B. Anderson, Terre Hill, both of Pa.

[73] Assignee: Sperry Rand Corporation, New Holland, Pa.

[22] Filed: April 2, 1970

[21] Appl. No.: 25,226

[52] U.S. Cl. .......................214/520, 198/7 BL, 198/128
[51] Int. Cl. .........................................................B60p 1/36
[58] Field of Search ............214/520, 521, 522, 6 B, 42 R, 214/42 A; 198/7 BL, 128

[56] References Cited

UNITED STATES PATENTS 3,448,879  6/1969  Vanderlely ..............................198/7 X
3,550,746  12/1970  Juul ....................................198/128 X Primary Examiner—Albert J. Makay
Attorney—Joseph A. Brown, John C. Thompson, James J. Kennedy and George C. Bower

[57] ABSTRACT

A bale wagon having bale pick up and bale thrower mechanism for picking up bales from the ground and for throwing them into the wagon mounted for up and down movement under influence of the wagon tongue and having a tail gate at its rear end for discharging loaded bales from the wagon for subsequent conveying into a barn or other point of storage.

15 Claims, 16 Drawing Figures

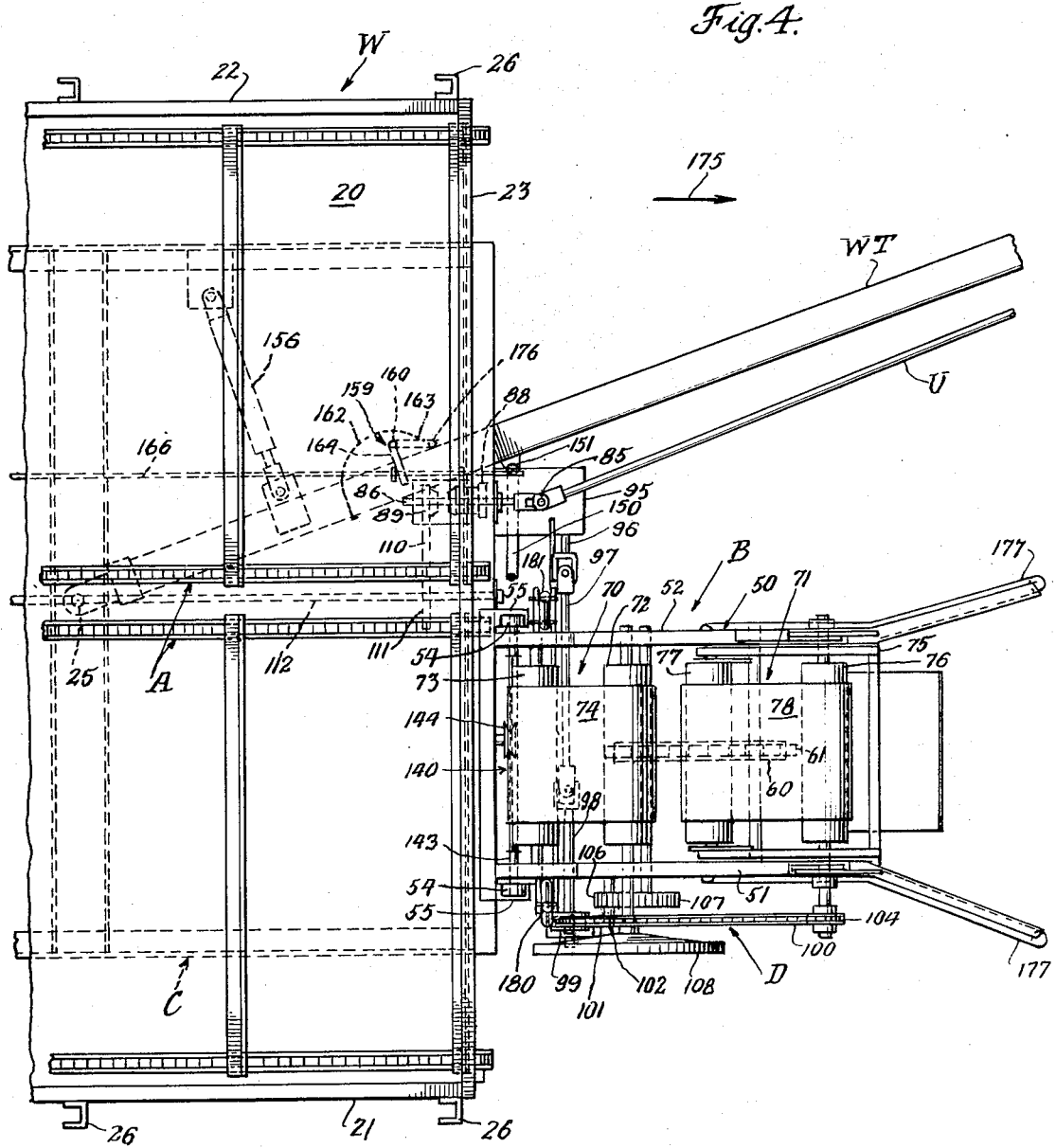

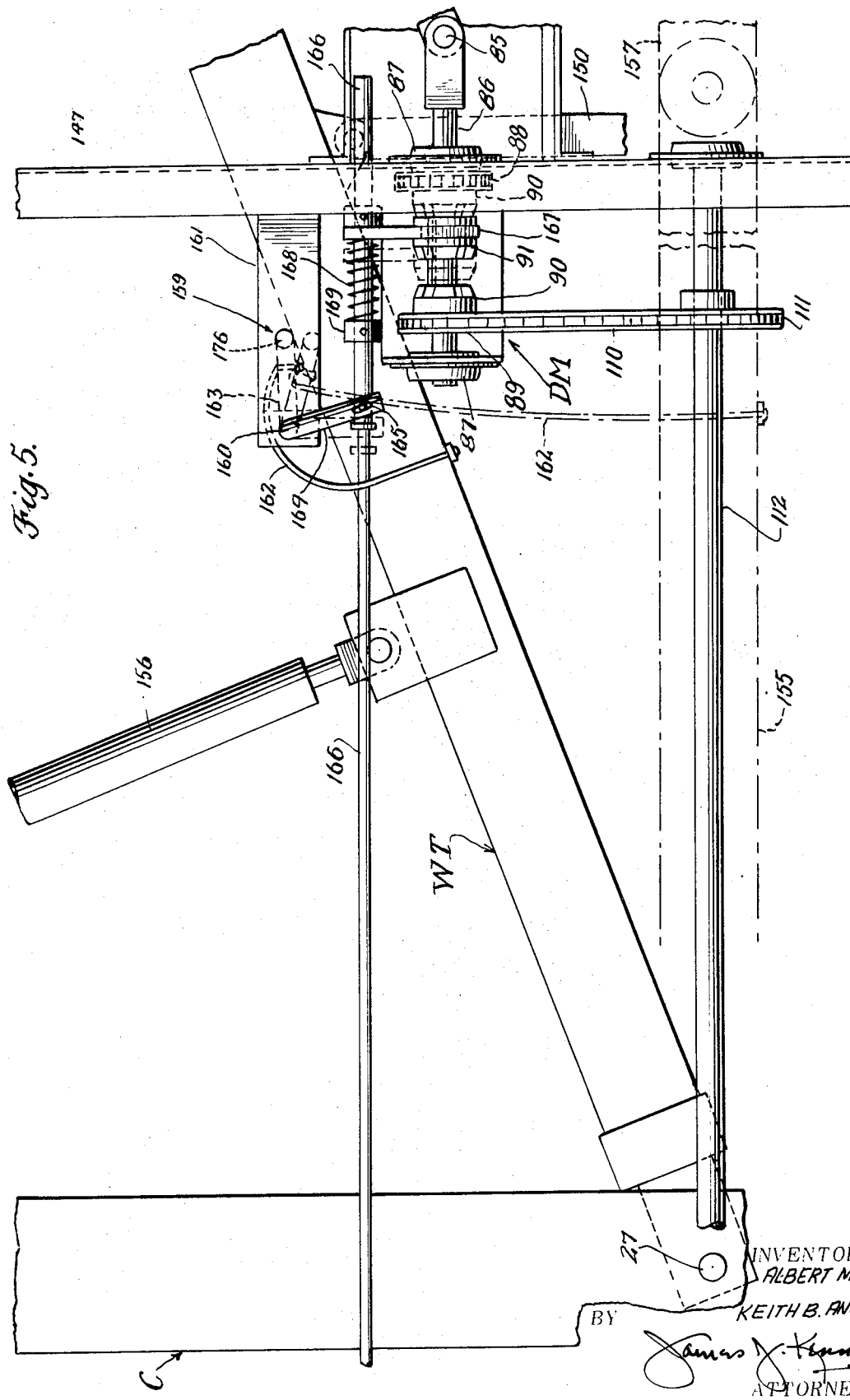

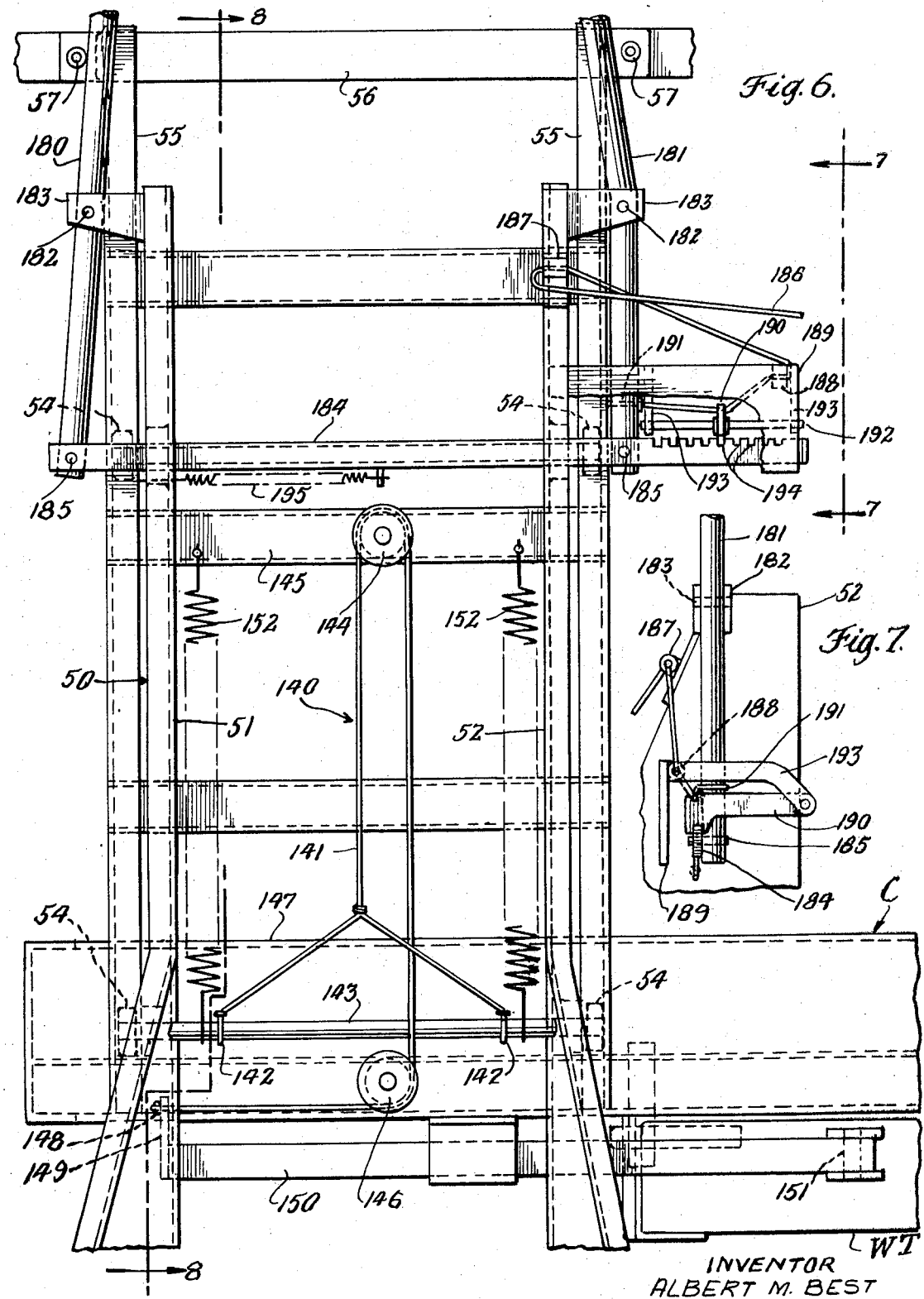

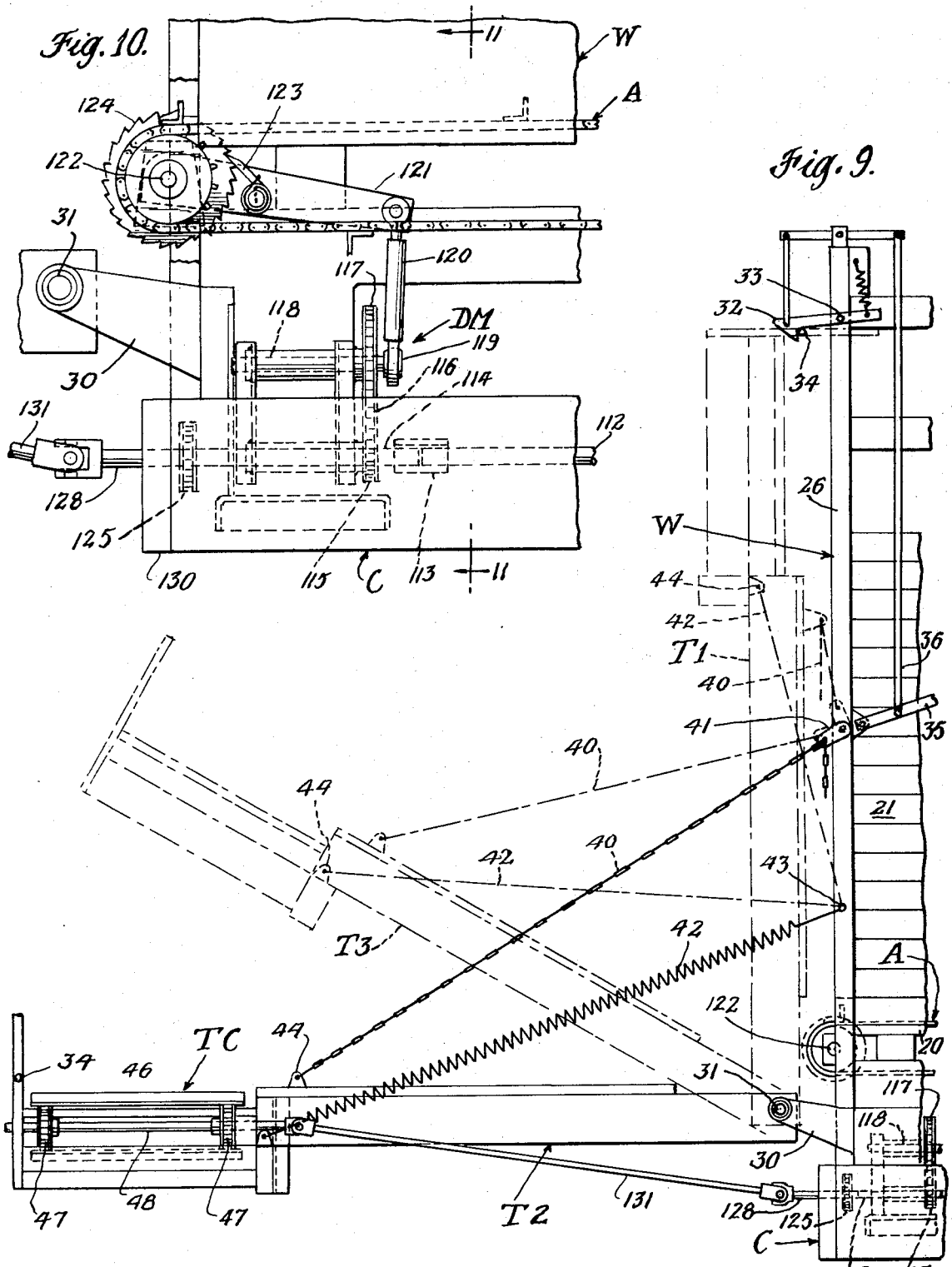

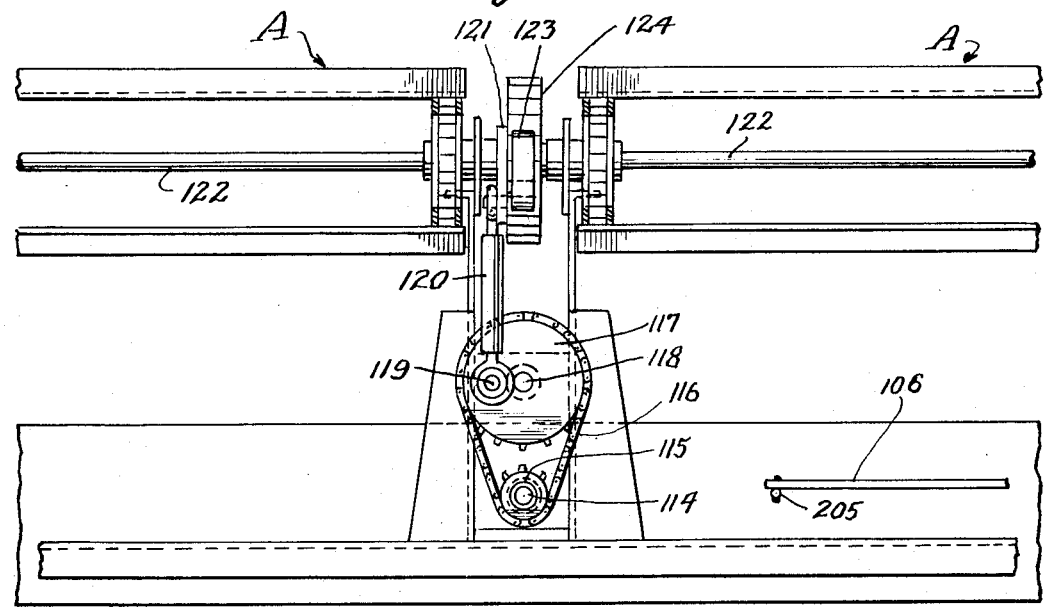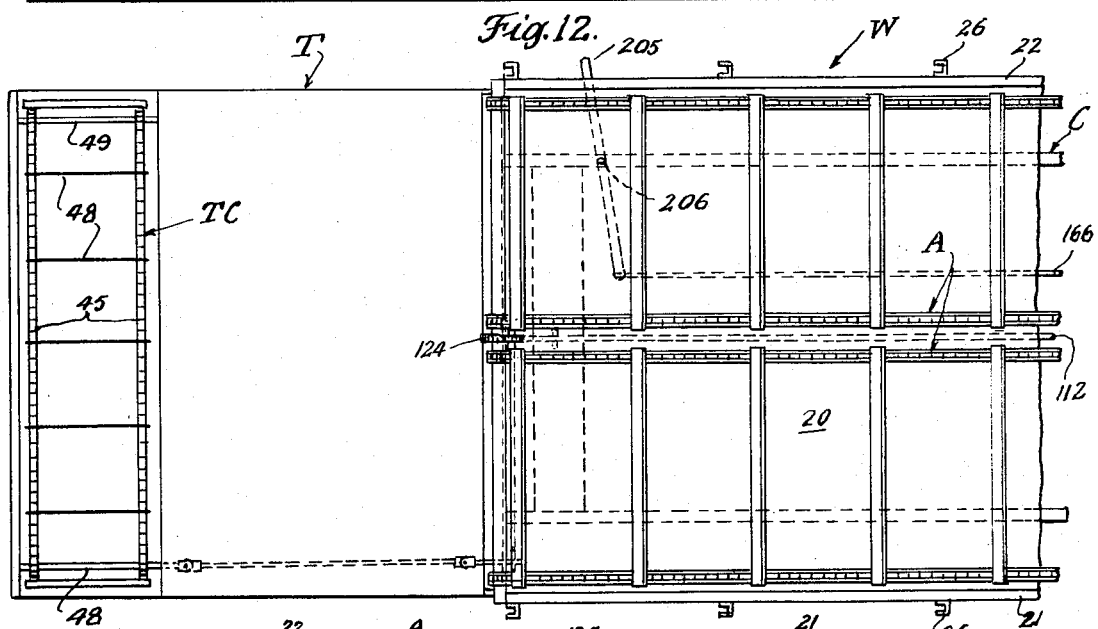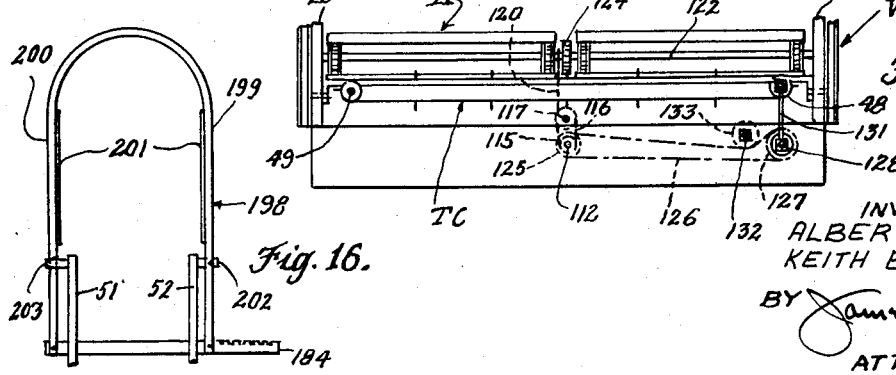

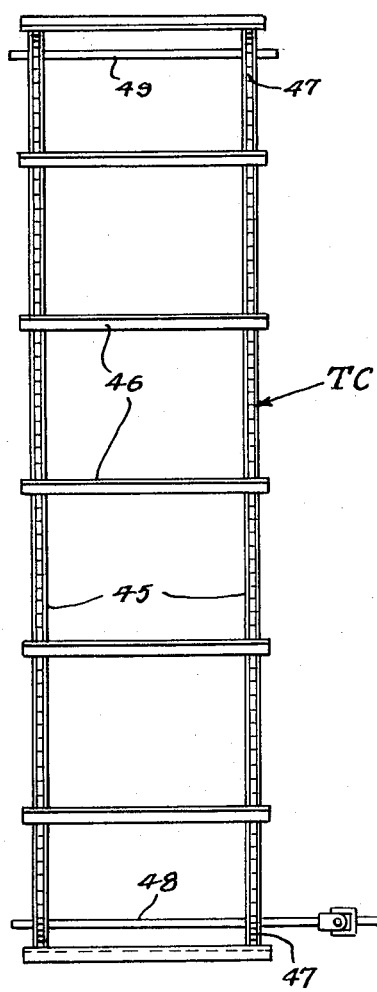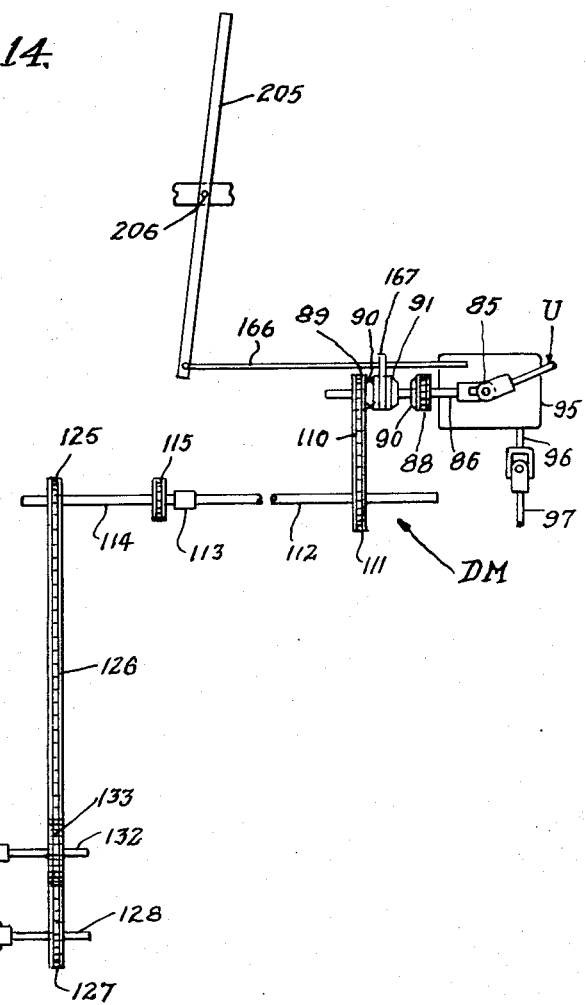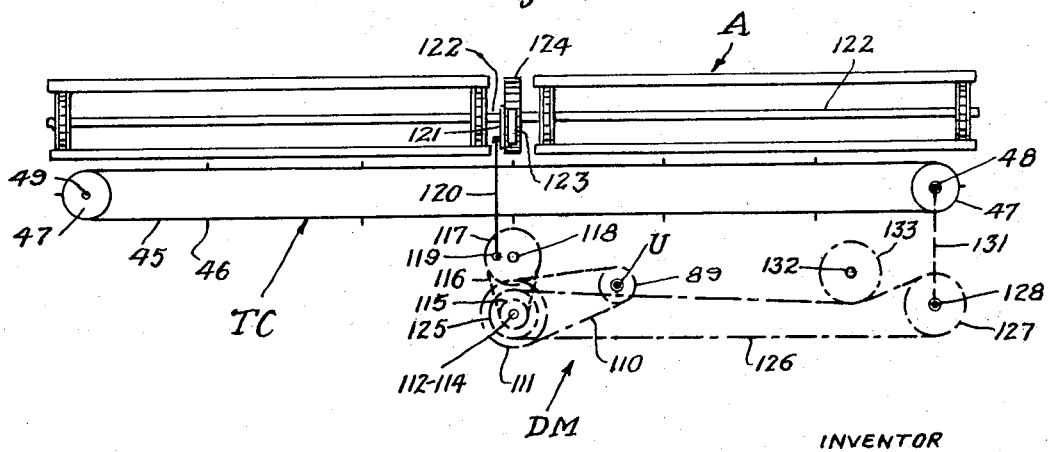

BALE WAGON

BACKGROUND OF INVENTION

The present invention relates to agricultural implements and more particularly to a bale wagon having mechanism at its front end for picking up bales from the ground and for throwing them into the wagon and having mechanism associated with the tail gate of the wagon for discharging loaded bales from the wagon to the side thereof.

It is known to provide bale wagons having mechanism for picking up bales from the ground and delivering them into the wagon and having mechanism to discharge loaded bales from the wagon.

The present invention is concerned with a number of improvements in the operation and control of the various components of wagons of this general kind which improvements facilitate the handling of the bales.

An object of the present invention resides in the provision of means to improve the delivery of bales into the wagon particularly when the wagon is operating on a side hill.

Another object of the present invention is to provide effective simplified drive mechanisms for the various operating components and to interconnect and coordinate them in a novel manner.

Another object of the present invention is the provision of simple and effective automatic means for positioning the bale loading mechanism in proper relation to the ground for either bale loading or transport operation of the wagon from place to place.

A further object of the invention is to provide means actuated by the wagon tongue for raising the bale loading mechanism to permit ample ground clearance level when the tongue is in wagon transport position and for lowering the bale loading mechanism to proper ground relation for effective bale pick up when the tongue is in bale loading position.

Another object of the invention is the provision of means effecting automatic bale pick up and bale thrower actuation upon movement of the wagon tongue from its transport position to its bale loading position.

Still another object of the invention resides in the provision in bale loading equipment of the character described of means for mounting the bale unit so as to yield under uneven ground conditions or in the presence of a ground obstruction.

A more specific object of the invention resides in the provision of novel clutch means associated with drive means for the bale loading mechanism and the apron conveyor of the wagon floor actuated by the wagon tongue.

A further object of the invention is the provision of transverse conveyor mechanism on the tail gate of the wagon operable at will to discharge bales to either side of the wagon.

How the foregoing and other objects and advantages are attained will appear more fully from the following description referring to the accompanying drawings.

BRIEF DESCRIPTION OF THE DRAWINGS

FIG. 4 is a plan view of FIG. 3;

FIG. 5 is a further enlarged fragmentary plan view taken approximately on the line 5—5 of FIG. 2 illustrating clutch control mechanism operatively associated with the wagon tongue of the equipment, certain parts being omitted for the sake of clarity;

FIG. 6 is an enlarged elevational view of the fixed main frame of the bale pick up and bale thrower unit and associated mechanism;

FIG. 7 is a fragmentary detail view taken as indicated by the arrows 7—7 in FIG. 6;

FIG. 9 is a fragmentary side elevation of the rear portion of the wagon and the tail gate with several positions of the tail gate appearing in broken lines;

FIG. 10 is an enlarged elevation of ratchet drive mechanism for the apron conveyor which extends from the front to the rear of the wagon, and drive mechanism for the transverse conveyor of the tail gate appearing in FIG. 9;

FIG. 11 is a section taken on the line 11—11 of FIG. 10;

FIG. 12 is a reduced scale plan view of the tail gate end of the wagon;

FIG. 13 is a reduced scale fragmentary rear end view looking toward the right in FIG. 9;

FIGS. 14 and 15 are diagrammatic views illustrating the drive system of the apron conveyor of the wagon and the apron conveyor of the tail gate; and FIG. 16 illustrates a modified form of bale deflection.

DESCRIPTION OF THE PREFERRED EMBODIMENT

The equipment of the present invention comprises in general a bale loading and unloading wagon W having a load carrying body; a chassis C; a wagon tongue WT; a bale pick up and bale thrower unit, indicated as a whole by the reference letter B, mounted at the front of the wagon; an apron conveyor A extending from the front to the rear of the wagon floor for moving bales rearwardly; a pivoted tail gate T; a transverse conveyor TC mounted on the tail gate; drive mechanism D for the bale pick up and bale thrower unit; drive mechanism DM for the apron conveyor A and the transverse conveyor TC; and a universal power shaft U. The wagon is hitched to a tractor or other propelling unit (not shown) having a P.T.O. by means of the tongue WT in usual manner and the power shaft U is connected to the P.T.O.

Figure 1:
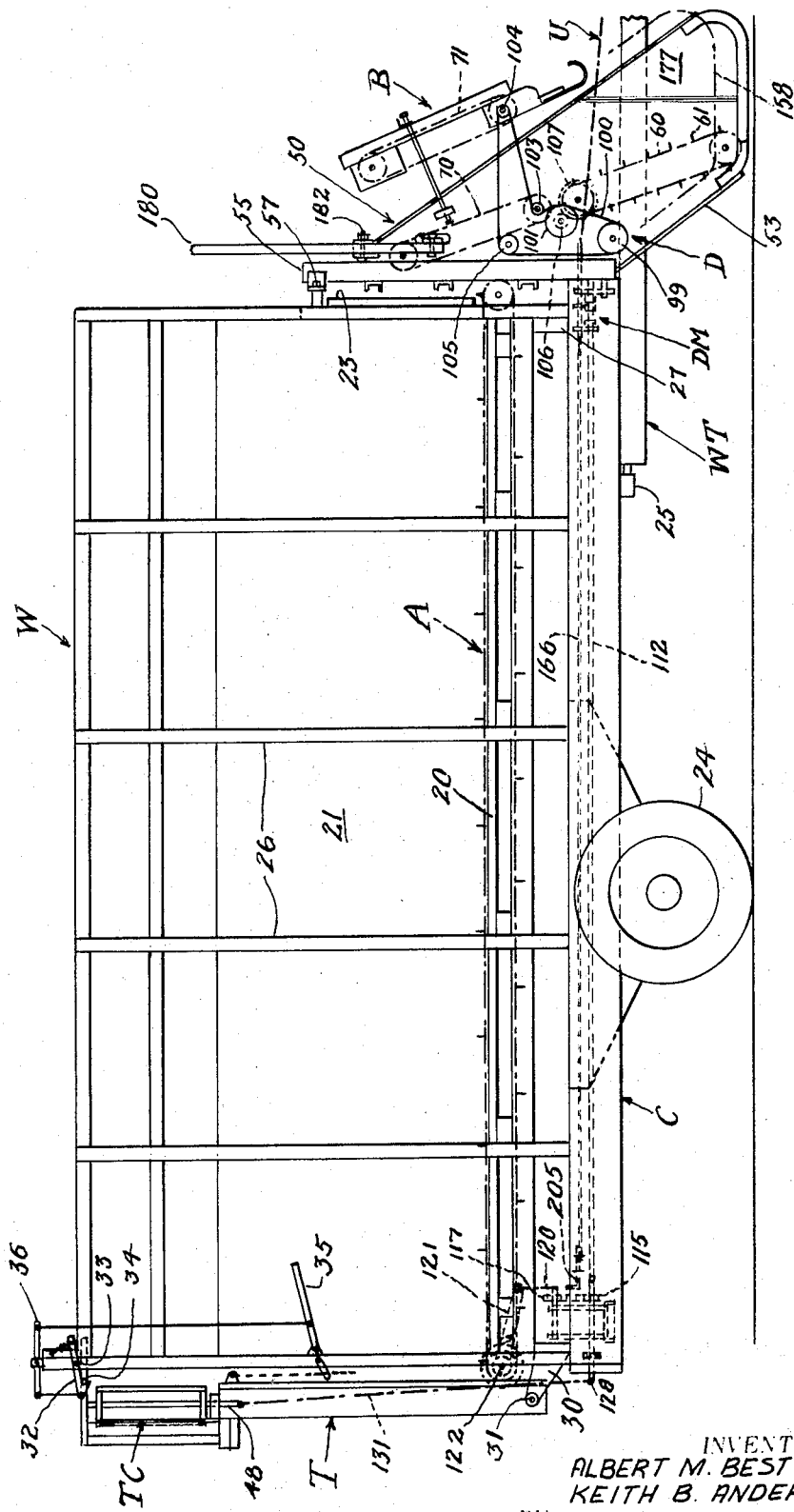
FIG. 1 is a more or less diagrammatic side elevation of a bale wagon constructed in accordance with the invention.

The bale wagon W has a floor 20, side walls 21 and 22, a front wall 23, the chassis C, ground wheels 24, the tongue WT pivotally connected to the chassis at 25, the tail gate T, suitable framework including upright braces 26 and cross braces 27 resting on the chassis. The rear tail gate T is pivotally carried by the wagon brackets 30 and pivot pins 31 and is adapted to be firmly latched in its upright closed position, as shown in FIGS. 1 and 9, by a readily releasable latch device comprising a latch 32 pivoted at 33 on the wagon and engageable with a cooperating latch pin 34 of the gate. The latch is spring loaded for snap closing action of the latch device. An operating handle 35 connected to the latch by a link and lever device 36 is provided to release the latch to open the gate.

When the wagon is being loaded with bales and when it is in transport from place to place the end gate T is latched in closed position as shown in FIG. 1. When bales are to be unloaded from the wagon the latch device is released by the handle 35 to lower the gate from the closed position T1 indicated in broken lines in FIG. 9 to a convenient bale unloading position, for example, to the horizontal position T2 or to the inclined position T3 illustrated in FIG. 9. The tail gate is held in adjusted position by support chains 40 adjustable in clips 41 pivoted on the wagon frame members 26. Counterbalancing springs 42, connected at an end to the wagon at 43 and at the other end to the gate at 44, are provided to aid in raising the gate to closed position.

The transverse conveyor TC of the tail gate T comprises a pair of apron chains 45, 45 carrying longitudinally spaced apron slats 46, and sprockets 47, 47 mounted on shafts 48 and 49. The manner of driving this conveyor will appear hereinafter.

BALE PICK UP AND BALE THROWER UNIT

The bale pick up and thrower unit B is in the form of a vertically movable carriage 50 mounted at the front of the wagon and having side plates 51 and 52, suitable cross braces including a bottom cross plate 53, and vertically spaced side rollers 54, 54 carried by the side plates adapted to ride in upright tracks formed by a pair of upright rugged channel members 55, 55 secured at the bottom of the chassis C and at the top to a cross brace 56 of the wagon by bolts 57.

Located centrally of the lower portion of the carriage is a bale pick up device in the form of an upright rearwardly inclined chain 60 having spaced bale engaging lugs 61 running over sprockets 62 and 63 screwed on shafts 64 and 65 having suitable bearings in the side plates.

Located above the pick up device and also carried by the carriage 50 is a bale throwing device comprising a pair of coextensive conveyors 70 and 71 spaced apart and operable to engage opposite sides of bales fed thereto by the pick up device and to traject the bales into the wagon.

Figure 2:
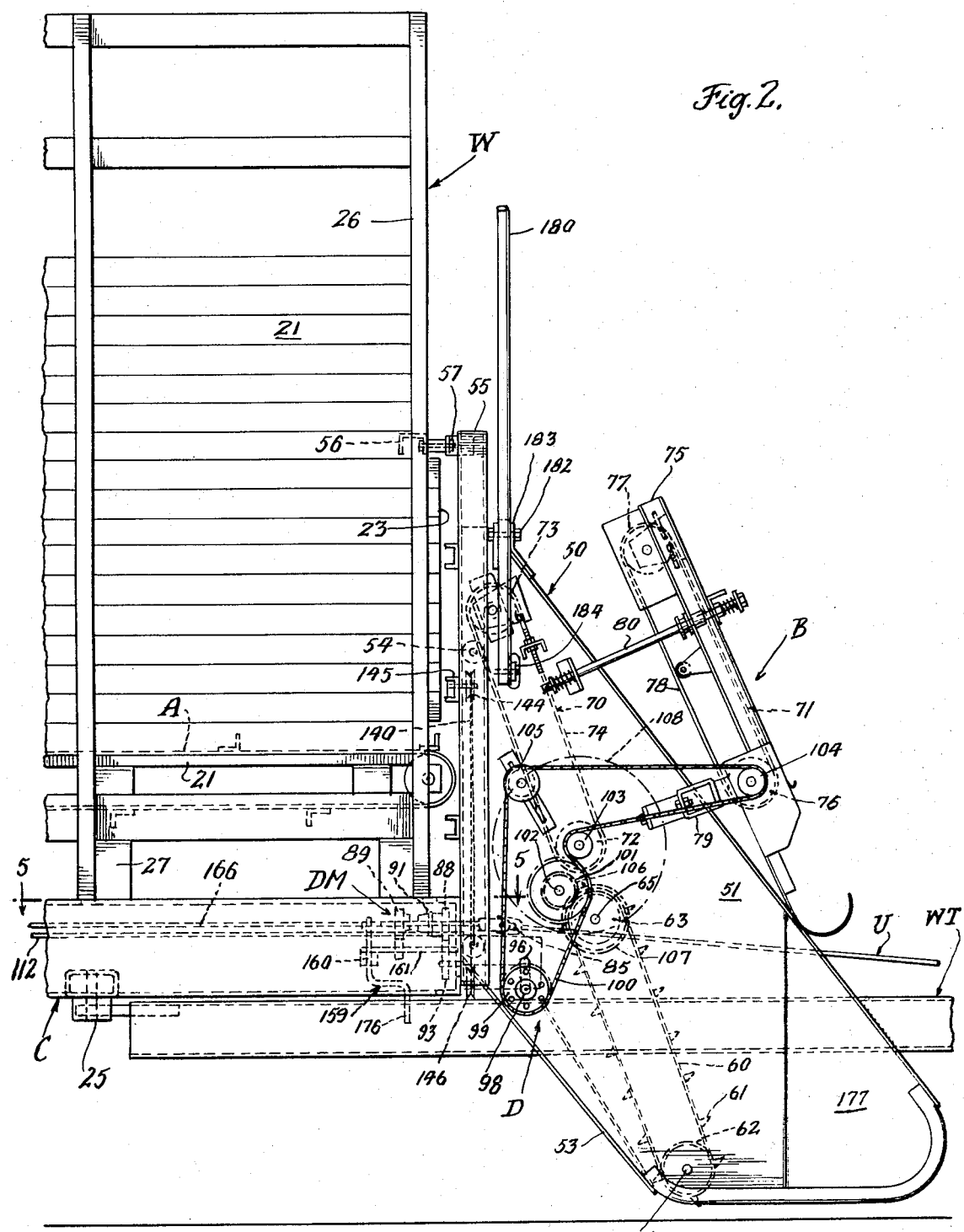
FIG. 2 is a somewhat enlarged side elevation of the front portion of the wagon with bale pick up and bale thrower mechanism constructed in accordance with the invention applied thereto.

The lower conveyor 70 comprises lower and upper rollers 72 and 73, journalled in the side plates 51 and 52 of the carriage, around which an endless belt 74 extends. The upper conveyor 71 comprises a frame 75 and lower and upper rollers 76 and 77, journalled in the frame 75, around which an endless belt 78 extends. Arms 79 pivotally support the upper conveyor 71 from the carriage 50 as seen in FIGS. 2 and 4 and a yieldable rod connection 80 yieldingly positions the discharge end of conveyor 71 in proper spaced relation to the lower conveyor 70.

DRIVE SYSTEM

Figure 8:
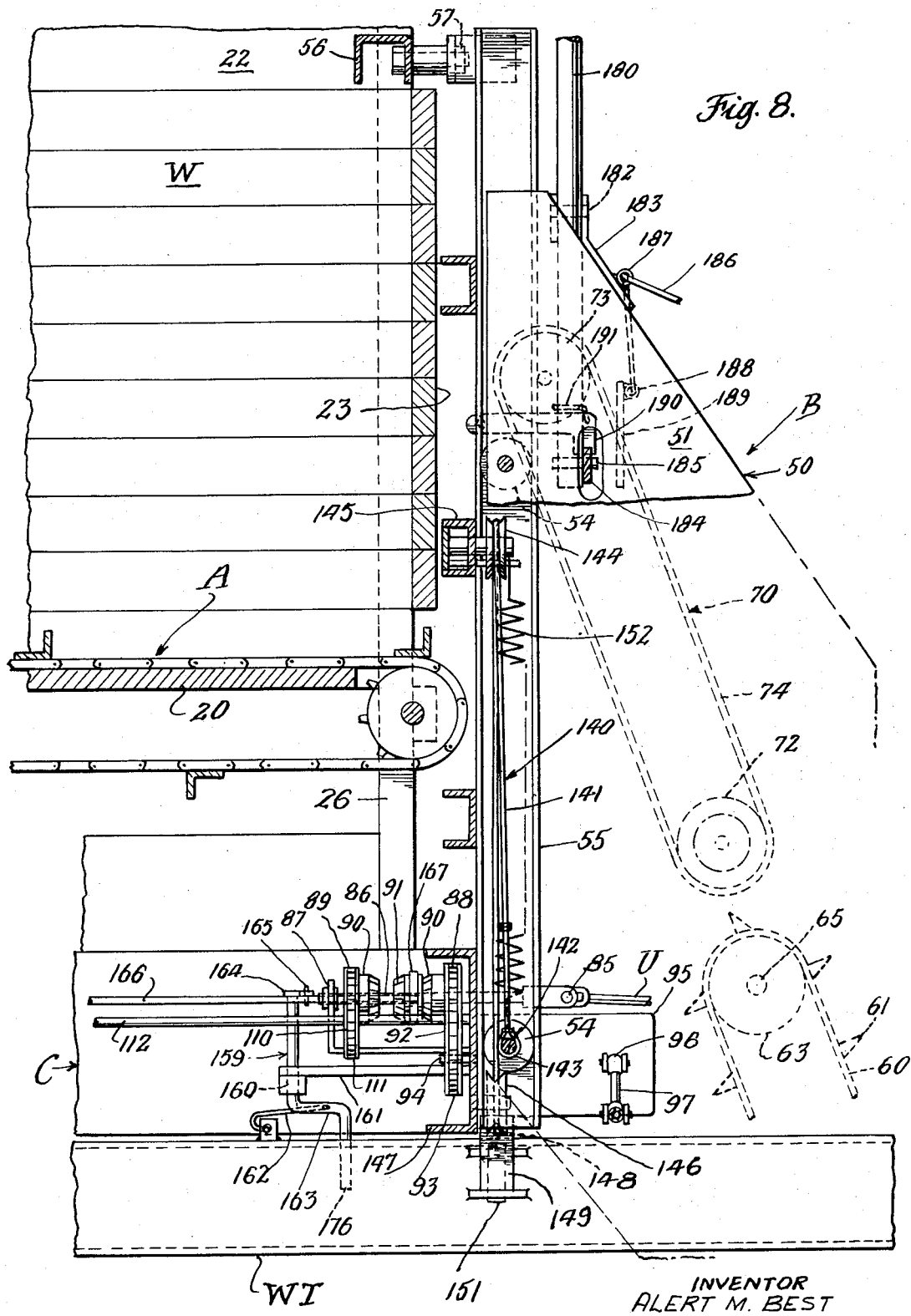
FIG. 8 is a vertical section taken approximately on the line 8—8 of FIG. 6.

Referring to the drive system for the various components, it is pointed out that power is transmitted from the P.T.O. of a tractor by means of the universal shaft U which is universally connected at 85 with a main drive shaft 86 of the drive system. As best seen in FIGS. 4, 5 and 8, the drive shaft 86 is rotatably mounted in bearings 87, 87 and has a pair of drive sprockets 88 and 89 rotatably mounted thereon in spaced relation and each provided with a clutch member 90 adapted to be engaged by a shiftable clutch member 91 keyed on the drive shaft 86 and controllable in a manner presently appearing.

The sprocket 88 is connected by drive chain 92 to a lower sprocket 93 secured on the input shaft 94 of a gearbox 95. The output shaft 96 of the gearbox is connected by a universal shaft 97 with a shaft 98 having a sprocket 99 secured thereon at its outer end (FIGS. 2 and 4). The sprocket 99 constitutes the drive sprocket for the pick up chain 60 and for the bale thrower conveyors 70 and 71.

As best seen in FIG. 2, a drive chain 100 leads upwardly from the sprocket 99 around a sprocket 101 secured on a shaft 102, then around a sprocket 103 on the shaft of the roller 72 of lower bale thrower conveyor 70, then around a sprocket 104 on the shaft of the roller 76 of the upper bale thrower conveyor 71, then over a belt tightener pulley 105 and finally back to the drive sprocket 99. The above shaft 102 also has a gear 106 secured thereon which meshes with a gear 107 secured on the shaft 65 of the bale pick up device. As seen in FIGS. 2 and 4, a flywheel 108 for the drive system is secured on the shaft of the roller 72 of the lower bale thrower conveyor 70.

The drive sprocket 99 rotates in a clockwise direction with the result that the forward reach of the pick up chain 60 travels upwardly to pick up bales and raise them to the upwardly moving belts 74 and 78 of the conveyors 70 and 71. The driving force of the upwardly moving reaches of the belts 74 and 78 throws the bales through a trajectory path upwardly and rearwardly over the front wall 23 and into the wagon.

The drive system also includes means for driving the apron conveyor A of the wagon and the transverse conveyor TC of the tail gate as follows:

The sprocket 89 of the main drive shaft 86 is drivingly connected by a chain 110 to a sprocket 111 secured on the longitudinal shaft 112 extending from the front to the rear of the wagon where it is connected by means of a coupling 113 (FIGS. 10 and 14) to a drive shaft 114 of the drive mechanism DM.

The drive mechanism DM comprises a sprocket 115 secured on the shaft 114, a drive chain 116 drivingly connecting the sprocket 115 to a sprocket 117 secured on a parallel shaft 118 (FIG. 11), a crank pin 119 mounted on the sprocket 117 and a universal link 120 connecting the crank pin 119 to a free end of a lever 121 pivoted on the drive shaft 122 of the apron conveyor A.

The lever 121 carries a spring loaded pawl 123 for actuating a ratchet wheel 124 secured on the drive shaft 122. As best seen in FIGS. 10 and 11, when the sprocket 117 is rotated, the lever 121 and pawl 123 are oscillated back and forth to rotate the ratchet wheel and impart step by step advancing movement to the apron conveyor A.

The drive shaft 114 also has a sprocket 125 secured thereon which is drivingly connected by chain 126 to a sprocket 127 secured on a stub shaft 128 having a bearing 129 in the cross beam 130 of the chassis C. A universal shaft 131 drivingly connects the stub shaft 128 to the shaft 48 of the transverse conveyor TC of the tail gate. As viewed in FIGS. 13 and 15 the sprocket 127 and stub shaft 128 rotate in a counterclockwise direction with the result that the transverse conveyor TC is driven in a direction so that bales discharged from the wagon and delivered onto the transverse conveyor travel to the left for discharge at the left side of the wagon.

When it is desired to have the bales discharge at the right side of the wagon the universal shaft 131 is disconnected from the stub shaft 128 and is connected to the adjacent stub shaft 132 having a wrap around sprocket 133 secured thereon in contact with the upper reach of the chain 126 to reverse the direction of the universal shaft 131 and the direction of travel of the conveyor.

CARRIAGE LIFT MECHANISM

Reverting now to the carriage 50 hereinbefore described and with particular reference to FIGS. 3 to 8, it will be seen that the carriage is suspended by a cable system 140 comprising a cable 141 secured at 142, 142 to the shaft 143 of the lower carriage rollers 54 and leading upwardly and around an upper pulley 144 mounted on a cross beam 145 rigidly secured to the fixed upright channels 55, and then downwardly and around a second lower pulley 146 mounted on the cross beam 147 of the chassis C, and finally leading horizontally for connection at 148 to a bracket 149 secured to the free end of a horizontally disposed bar 150 which is pivotally connected at 151 to the wagon tongue WT.

Referring particularly to FIGS. 6 and 8 a pair of vertically disposed springs 152, 152, anchored at their upper ends to the fixed cross beam 145 and at their lower ends to the carriage roller shaft 143, are provided. These springs exert an upward pull on the carriage and counteract some of the weight of the carriage. When the carriage moves from raised to lowered position the weight of the carriage overcomes the action of the springs and the springs become tensioned so that the carriage is yieldingly suspended.

In this connection it is pointed out that without provision to the contrary, if very rough ground or an obstacle on the ground were encountered by the carriage, binding of or damage to the carriage could result. The yielding suspension of the carriage just described advantageously enables the carriage to yield upwardly under such conditions thus avoiding objectionable consequences.

CONTROL AND OPERATION

When the equipment is conditioned for load transport or road travel the wagon tongue WT is swung to its central position, indicated in broken lines at 155 in FIG. 5, by means of a hydraulic cylinder 156 and the wagon tongue is hitched to the tractor drawbar 157 thus positioning the tractor and wagon in line.

In this position it is necessary that the carriage 50 be raised to a height such as indicated in broken lines at 158 in FIG. 1 in order to provide ample ground clearance during transport and road travel. To the automatic accomplishment of this end the wagon tongue is adapted, when in its central position 155, to actuate the pivoted bar 150 in a direction to create a pull on the cable 141 of the carriage lift system 140 and thereby raise the carriage to its desired ground clearance position.

In addition the wagon tongue when in its central position is adapted to automatically neutralize the drive mechanism D of the pick up chain 60 and the bale thrower conveyors 70 and 71 as well as the drive mechanism DM for the apron conveyor A and tail gate conveyor TC. To accomplish this, the wagon is provided with a clutch control mechanism (FIGS. 2, 4, 5 and 8) comprising a clutch control lever 159 pivoted at 160 in a fixed bracket 161 secured to the chassis cross beam 147 and a pull cable 162 connected at one end to the wagon tongue WT and at its other end to the lower arm 163 of the lever 159. The lever 159 is also provided with an upper arm 164 having pin and slot connection 165 with a clutch shifter rod 166. The rod 166 carries a clutch shifter fork 167 operating in an annular groove in the shiftable clutch member 91. It will be seen from FIG. 5 that when the wagon tongue is swung to its central position the cable 162 pivots the lever 159 so that its upper arm 164 swings to the left to shift the clutch shifter fork to the left thereby shifting the clutch member 91 into a neutral position in which the drive system is idled.

The shifter fork 167 is spring loaded (FIG. 5) by means of a compression spring 168 located between it and a spaced collar 169 fixed on the shifter rod 166. Thus, the clutch member 91 when shifted, as later described, to clutch engaging position is adapted to yield and effectively find the jaws of the clutch member 90. The jaws of the clutch members have suitable sloping faces aiding in this engagement and also enabling the clutch member 91 to ratchet in the event of overrunning flywheel action of the drive system.

When the equipment is employed for bale loading the propelling tractor travels in a path to one side of the path of the bale wagon, i.e. to the left side of the front of the wagon in the direction of travel indicated by the arrow 175 in FIG. 4. In this position the wagon tongue WT is swung, by the cylinder 156 to the angular position shown in FIGS. 4 and 5 and the horizontal bar 150 (FIGS. 3 and 6) releases its pull on the cable 141 of the cable lift system to automatically lower the carriage 50 by gravity to its bale loading position with the bottom of the carriage relatively close to the ground level, for example, a few inches above the ground, it being noted that the carriage is shown in this position in FIGS. 1, 2 and 3.

The wagon tongue in moving to its angular position also trips the clutch shifter rod 166 to engage the shiftable clutch member 91 with the clutch member 90 of the drive mechanism D of the bale pick up and bale thrower unit B. This is accomplished by the wagon tongue engaging a depending arm 176 (FIGS. 2, 5 and 8) of the pivoted clutch control lever 159 and pivoting the lever so that its upper arm 164 shifts the shifter rod 166 and fork 167 to the right to engage shiftable clutch member 91 with the drive sprocket 88. It is to be observed that with the clutch in this engaged position the drive sprocket 89 is disengaged to idle the drive mechanism DM of the apron conveyor A and tail gate conveyor TC.

As the wagon is propelled in forward direction bales are scooped from the ground by the flared portions 177 of the side plates 57 and 52 of the carriage 50 and are then raised by the pick up chain to and between the upwardly moving reaches of the belts of the bale thrower conveyor 70 and 71 and there trajected over the front wall of the wagon to the wagon floor.

It is here pointed out that when the equipment is operating on a side hill with, for example, with the right side of the equipment at a lower elevation than the left side, unless provision is made to the contrary, bales will be thrown toward the right wall of the wagon to build up in height to the top of the wagon and finally bales will spill over the side of the wagon.

In order to prevent this, the present invention provides a bale deflector system adapted to deflect bales being trajected into the wagon toward the center or left side of the wagon using the energy of the trajected bales to particularly locate the bales in the desired location in the wagon. As will be described hereinafter, will be seen that this deflecting means also functions to similarly deflect bales when the equipment is operating on a left side hill.

Referring particularly to FIGS. 2, 3, 6, 7 and 8 the deflecting system just referred to comprises a pair of spaced upright deflector arms 180 and 181 pivotally mounted by pins 182 in brackets 183 secured to the top portion of the side plates 50 and 51 of the carriage 50 and an actuating bar 184 to which the lower ends of the arms are attached by pins 185. The arms extend well above the top of the front wall 23 of the wagon and the bales trajected by the bale thrower pass between the upper portion of the arms in being discharged into the wagon. With the deflector arms in the position shown in FIG. 3 the bales are delivered substantially straight into the wagon.

The actuating bar 184 is manually operated to alter the angular position of the deflector means by a pull rope 186 the free end of which leads to a convenient point of access, preferably to the driven seat of the propelling tractor. The pull rope passes through an eyelet 187 secured to the side plate 52, then through an eyelet 188 secured to a bracket plate 189 carried by the side plate, then through an aperture in a pawl 190 and finally it is attached to the deflector arm 181 at 191. The pawl 190 is pivotally mounted on a rod 192 secured in brackets 193, 193 (FIGS. 6 and 7) of the bracket plate 189. As seen best in FIGS. 6 and 7, the actuating bar 184 is provided with a plurality of notches 194 engageable by the pawl 190. With the pawl engaged in the middle notch 194 as shown in FIG. 6 the deflector arms 180 and 181 are held in the substantially vertical position of FIG. 3 and the bales pass freely between the bars for delivery into the wagon.

Figure 3:
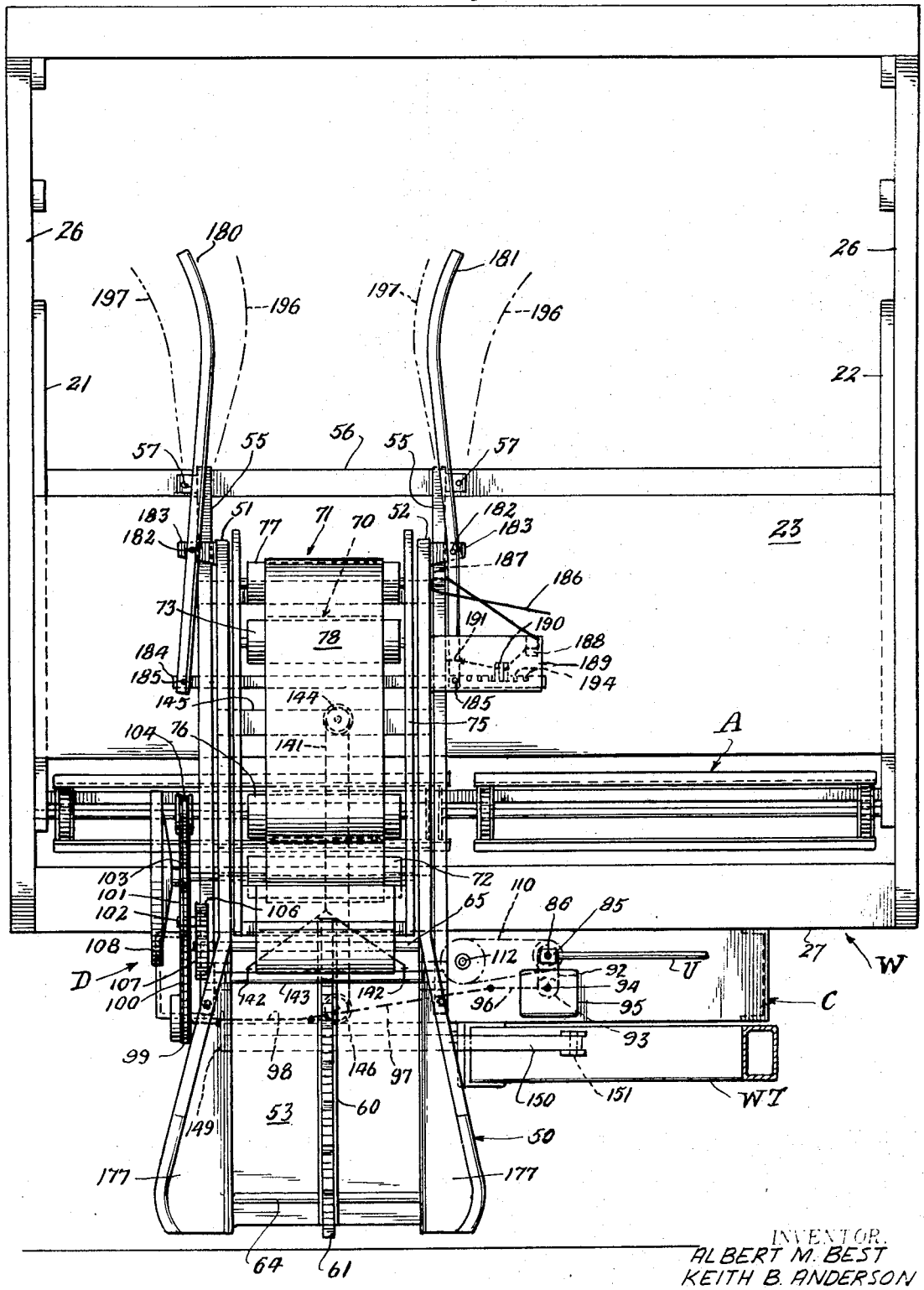
FIG. 3 is an end view of FIG. 2 looking toward the left.

Assuming now that the wagon is travelling on a side down hill at the left as viewed in FIG. 3 then the operator yanks the rope 186 to lift the pawl 190 out of its notch with the result that the bar 184 moves to the left by action of spring 195. This, by reason of the pin connections 185, 185 of the bar to the deflector arms, causes the arms to pivot on the pivot pins 182, 182 to the position indicated by broken lines 196, 196 in FIG. 3. The operator then releases the rope and the pawl drops into an advanced notch of the actuating bar to hold the deflector arms in their adjusted position. With the arms in this position the bales are deflected well to the right thus preventing them from piling up at the leaning side wall 21 of the wagon and finally spilling over the side.

After the wagon again is travelling on level ground the operator pulls on the rope to retract the pawl and when the deflector arms reach their vertical position the pawl is released to hold the arms in adjusted position.

In connection with the actuation of the deflector arms it is to be understood that it is within the skill of an operator to manipulate the pull rope 186 so as to have the pawl drop into any of the several notches of the actuating bar 184 and thereby adjust the position of the deflector arms to deflect bales to any desired spot in the wagon.

In the modification illustrated in FIG. 16 the bale deflector 198 is arch shaped in construction and the legs 199 and 200 of the arch are provided with baffle plates 201 to aid in effective deflection of the bales. The leg 199 is pivotally mounted at 202 on the side plate 52 of the carriage 50 and the leg 200 is guided in a bracket 203 of the side plate 51.

Reverting now to the apron conveyor A and the transverse conveyor TC it is pointed out that after the wagon is loaded with bales and is transported to the point of bale delivery, the tail gate is lowered and the two conveyors are started in operation. For this purpose a clutch control lever 205 (FIGS. 12 and 14) is provided, at a convenient access point near the tail gate, which lever is pivoted on the chassis at 206 and which is connected by the clutch actuating rod 106 extending from the control lever to the shiftable clutch member 91 (FIGS. 5 and 14) as above described.

Forward actuating of the clutch control lever 205 to the position shown in FIG. 14 shifts the clutch member 91 rearwardly out of engagement with the drive sprocket 88 of the bale pick up and bale thrower and into engagement with the drive sprocket 89 of the apron conveyor and tail gate conveyor thus idling the drive sprocket 88 and activating the drive sprocket 89 to drive the conveyors A and TC. The operator then pulls bales discharged onto the tail gate by the apron conveyor A and deposits them onto the tail gate conveyor TC for delivery to either side of the wagon according to which one of the stub shafts 128 and 132 has been selected for drive of the transverse conveyors.

It will be seen from the foregoing description that through the practice of the present invention a novel bale wagon is provided for loading and unloading bales picked up from the ground in which the bale loading unit B is mounted on a carriage adapted to be automatically moved to an effective bale loading elevation, shown in full lines in FIG. 1, when the wagon tongue is in its angular bale loading position (FIGS. 4 and 5) and to ample ground clearance position, shown in broken lines 158 in FIG. 1, when the tongue is in its straight transport position 155 of FIG. 5. Another important feature is that the drive system for the bale loading unit B is automatically rendered operational when the tongue is in its angular bale loading position and is rendered idle when the tongue is in its straight transport position. The disclosed drive system is also unique in that, although it constitutes a common drive for the bale loading unit and for the conveyors A and TC, drive to the conveyors A and TC is idle when the bale loading unit B is being driven. A further important feature is in effectively kicking or deflecting bales into the wagon in a direction to prevent spilling of bales when the wagon is operating on a side hill. As previously pointed out the direction of travel of the tail gate transverse conveyor can be reversed in a simple manner to discharge bales to either side of the wagon.

While a preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A bale wagon adapted to travel forwardly to pick up the bales lying on the ground and load them into the wagon comprising a bale pick-up and bale throwing unit mounted at the forward end of the wagon, a vertically movable carriage mounting said unit, a carriage lift mechanism associated with said carriage, a tongue pivotally mounted to said wagon, and means connecting said pivoted tongue to said carriage lift mechanism to effect raising and lowering of said carriage in accordance with the position of said tongue.

2. A bale wagon as recited in claim 1 wherein said bale pick up and bale throwing unit comprises a lower pick up mechanism adapted to pick up bales from the ground and advance them upwardly, and bale thrower mechanism mounted above said pick up mechanism adapted to receive advanced bales and traject them into the wagon.

3. A bale wagon as recited in claim 1 wherein said connecting means is adapted to vertically position said carriage to a predetermined height when said tongue is in one pulling position and to another height when said tongue is in another pulling position.

4. A bale wagon as recited in claim 1 wherein said lift mechanism includes spring suspension means adapted to yield upon unintended upward movement of the carriage.

5. A bale wagon as recited in claim 1 wherein said lift mechanism includes a lifting cable and wherein said means connecting said pivoted tongue to said carriage lift mechanism comprises an actuating means connected at one end to said wagon tongue and at its other end to said lifting cable.

6. A bale wagon adapted to travel forwardly to pick up bales lying on the ground and load them into the wagon comprising a pair of spaced upright channel members secured to the front of said wagon, a carriage mounted on said channel members for up and down movement, said carriage having rollers adapted to track on said upright channel members, bale pick up mechanism mounted in the lower portion of said carriage, bale thrower mechanism mounted in said carriage above said pick up mechanism adapted to traject bales received from said pick up mechanism into the wagon, and means for automatically vertically positioning said carriage to different ground clearance positions.

7. A bale wagon as recited in claim 6 wherein said bale wagon has a pivoted tongue and wherein said means for automatically vertically positioning said carriage comprises a lifting cable connected at one end to said carriage and at its other end to said wagon tongue.

8. A bale wagon adapted to travel forwardly to pick up bales lying on the ground and load them into the wagon, said wagon comprising a pivoted tongue having first and second pulling positions, bale pick up means and bale thrower means mounted on the front of the wagon, drive means for said bale pick up and bale thrower means, control means for said drive means, and means operatively connecting said control means to said wagon tongue for actuating said control means to establish drive of said bale pick up and thrower means when said tongue is in one pulling position and to idle said drive when said tongue is in another pulling position.

9. A bale wagon as recited in claim 8 wherein said wagon has an apron conveyor for moving bales rearwardly for discharge and wherein said drive means for said bale pick up and bale thrower means also drives said apron conveyor and wherein said control means idles the conveyor drive when said tongue is in either of said pulling positions.

10. A bale wagon as recited in claim 9 wherein manually operable means is provided to effect drive of said apron conveyor by said drive means and to idle said drive of the bale pick up and thrower means.

11. A bale wagon as recited in claim 8 wherein said control means comprises a clutch operatively connected to said wagon tongue to be engaged when said wagon tongue is in one pulling position and to be disengaged when said wagon tongue is in another pulling position.

12. A bale wagon as recited in claim 9 wherein said control means comprises a clutch operatively connected to said wagon tongue to engage and disengage said clutch with said drive means to control drive of the bale pick up and bale thrower means in accordance with the position of said wagon tongue and manually actuated means for effecting engagement and disengagement of said drive means with said apron conveyor.

13. A bale wagon comprising a wheel supported maneuverable chassis, a pivoted tongue having first and second operative positions adapted to be hitched to a propelling vehicle to pull said wagon to travel forwardly over the ground to pick up a series of bales lying on the ground in spaced relation to each other, a bale loader including bale pick up and bale thrower mechanisms mounted on the front of said wagon and adapted to pick up bales from the ground and to traject them into the wagon, a tail gate pivotally mounted at the rear of said wagon for movement from closed to open positions, an apron conveyor for moving bales loaded in said wagon from the front of the wagon to said rear tail gate, a transverse conveyor mounted on said tail gate for unloading bales from said wagon, drive means for said bale pick up and bale thrower mechanism and for said apron and transverse conveyors, clutch control means for said drive means, means connecting said clutch control means to said wagon tongue for disengaging clutch means to idle said drive means when said tongue is in one operative position and for engaging said clutch means to effect driving of said bale pick up and thrower mechanisms while idling said apron and transverse conveyors when said tongue is in the other of said operative positions and manually operable control means, including an actuating lever, for engaging said clutch means to effect drive of said two conveyors while idling drive to said bale pick up and thrower mechanisms.

14. A bale wagon as recited in claim 13 wherein said drive means for said transverse conveyor of said tail gate includes a drive shaft, a detachable universal shaft for drivingly connecting said drive shaft to said transverse conveyor to impart driving force in one direction to said transverse conveyor and a second drive shaft adapted to be drivingly connected to said transverse conveyor by said universal shaft to impart driving force in the opposite direction to said transverse conveyor.

15. A bale wagon as recited in claim 14 wherein first mentioned drive shaft is drivingly connected to said drive means by sprocket and chain means and wherein said second mentioned drive shaft is drivingly connected to said drive means by a wrap around sprocket engaging the chain of said sprocket and chain means.

* * * * *